Figure 1:
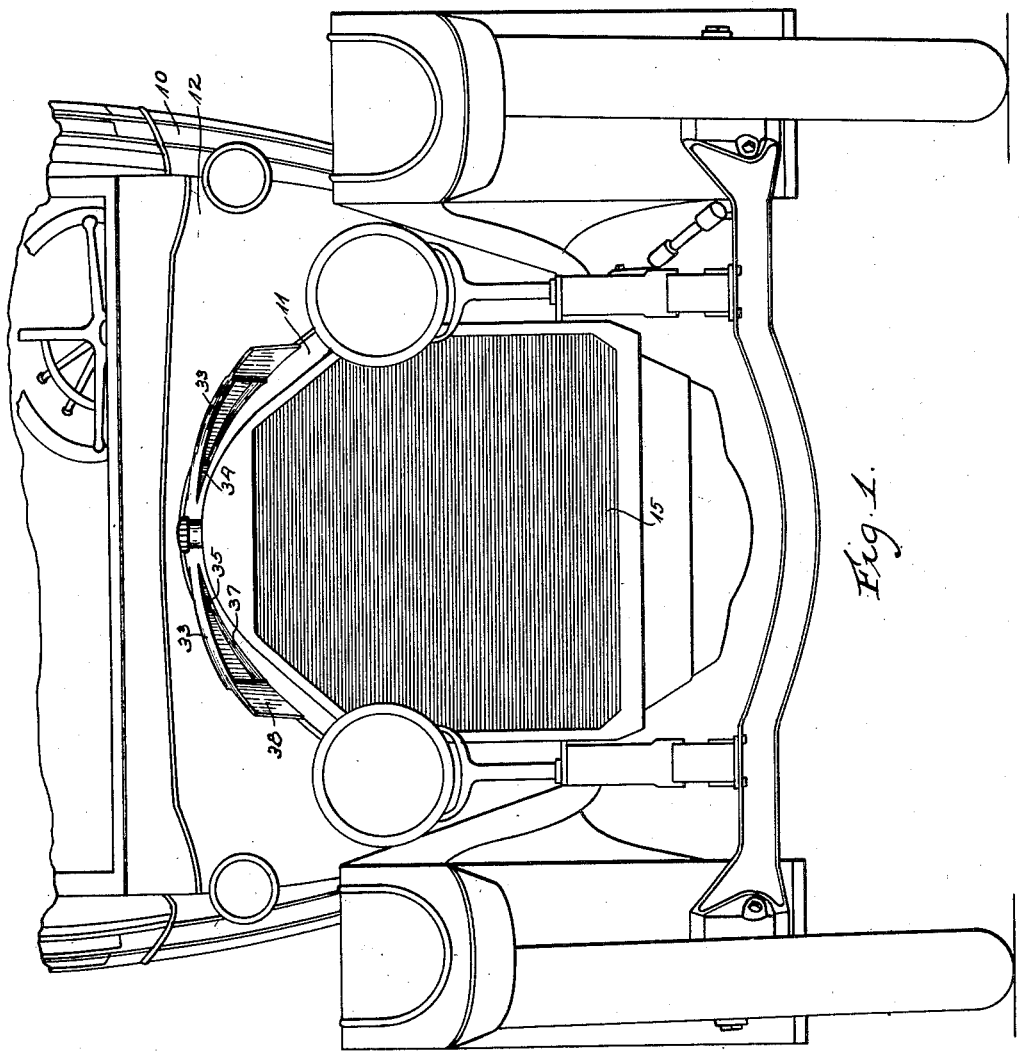

T. H. GARLAND.
VENTILATING APPARATUS.
APPLICATION FILED DEC. 18, 1914.

1,163,138.

Patented Dec. 7, 1915.
4 SHEETS—SHEET 1.

WITNESSES:

INVENTOR.
Thomas H. Garland
BY
ATTORNEYS.

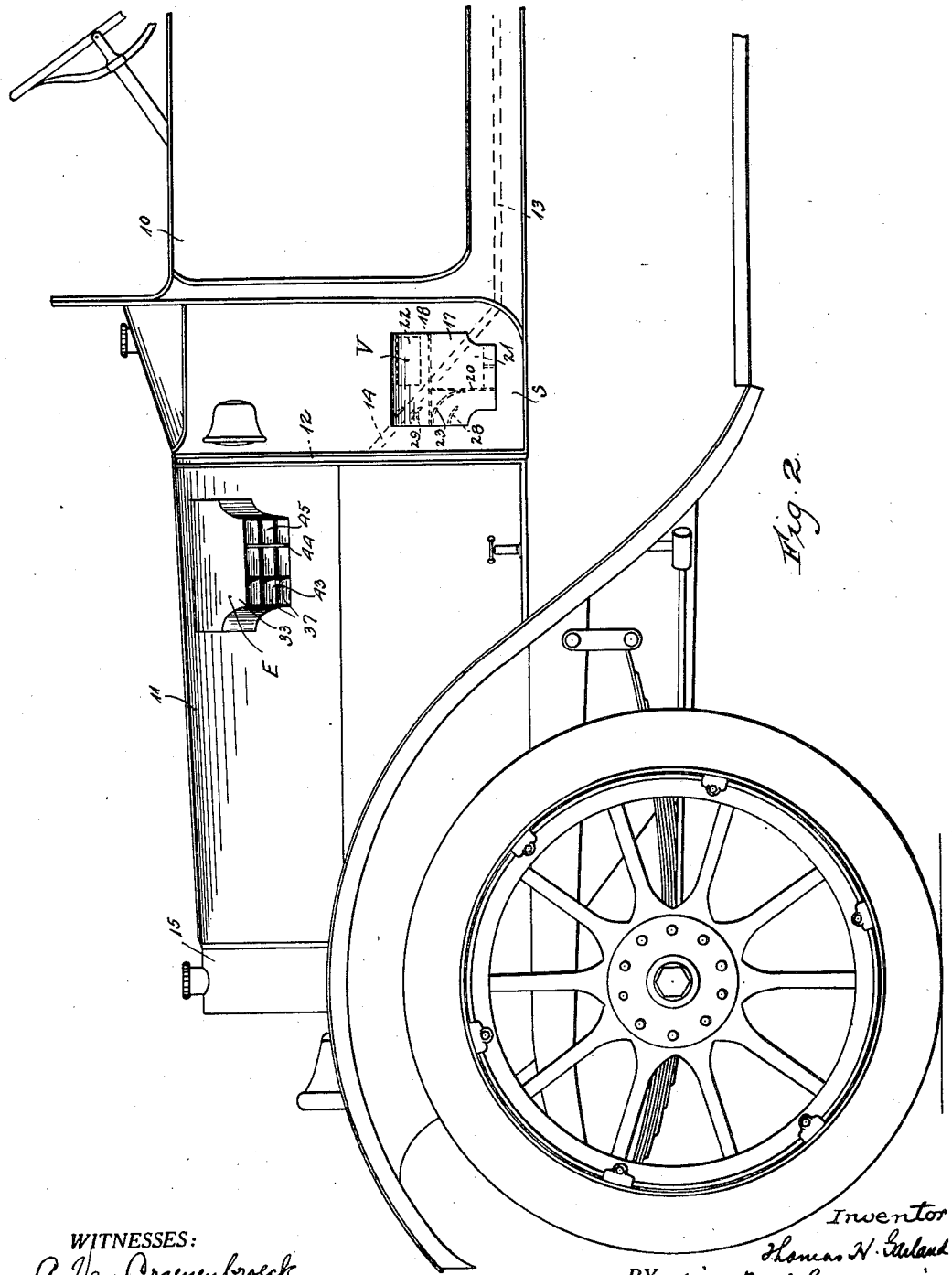

T. H. GARLAND.
VENTILATING APPARATUS.
APPLICATION FILED DEC. 18, 1914.
1,163,138.
Patented Dec. 7, 1915.
4 SHEETS—SHEET 3.
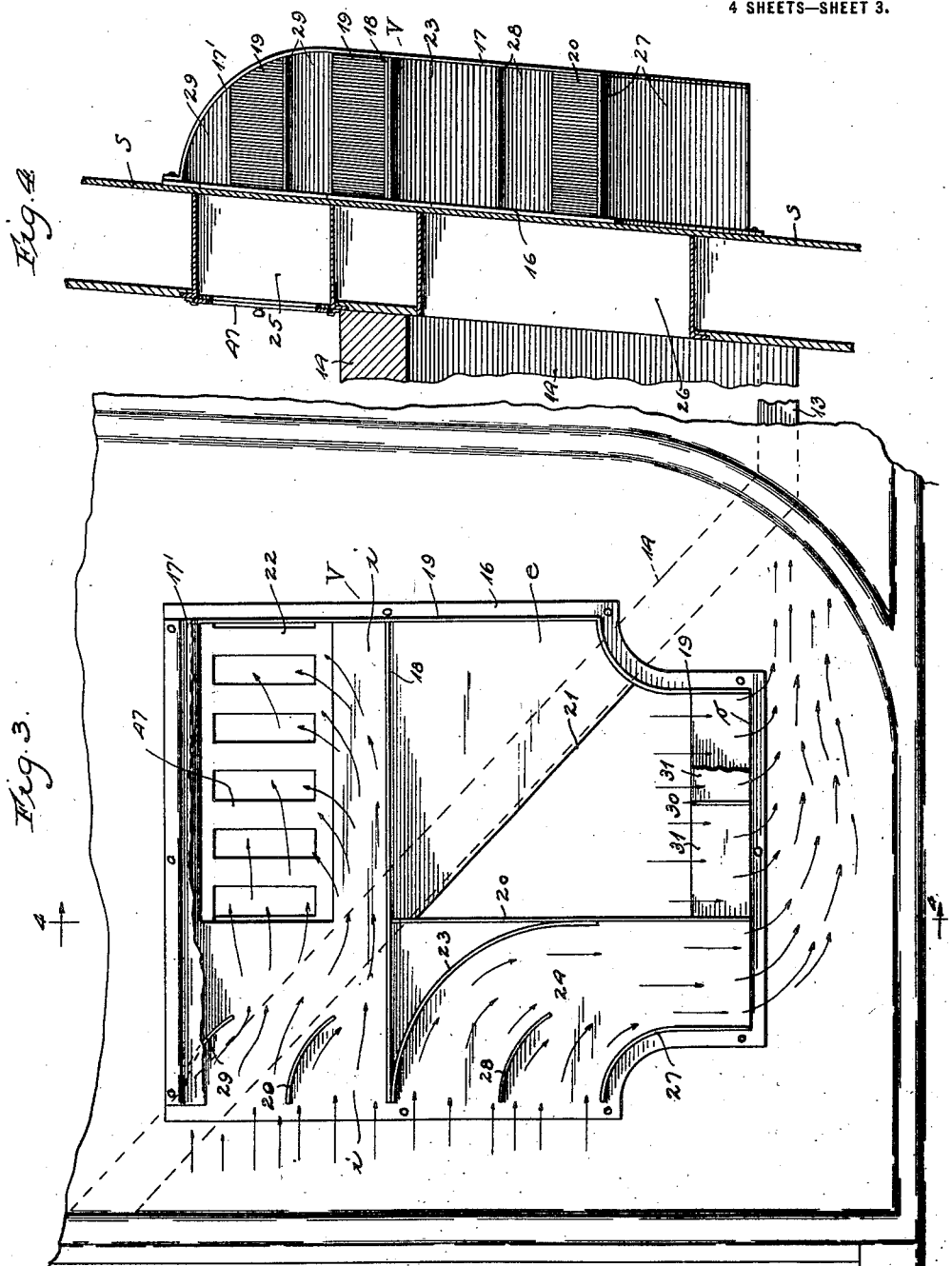

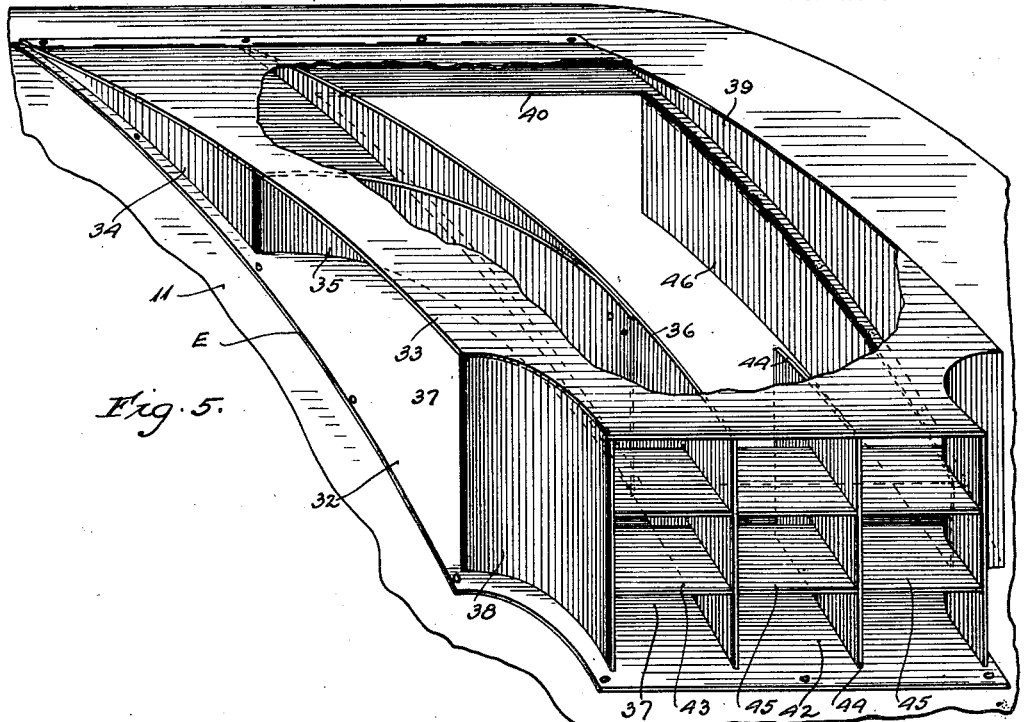
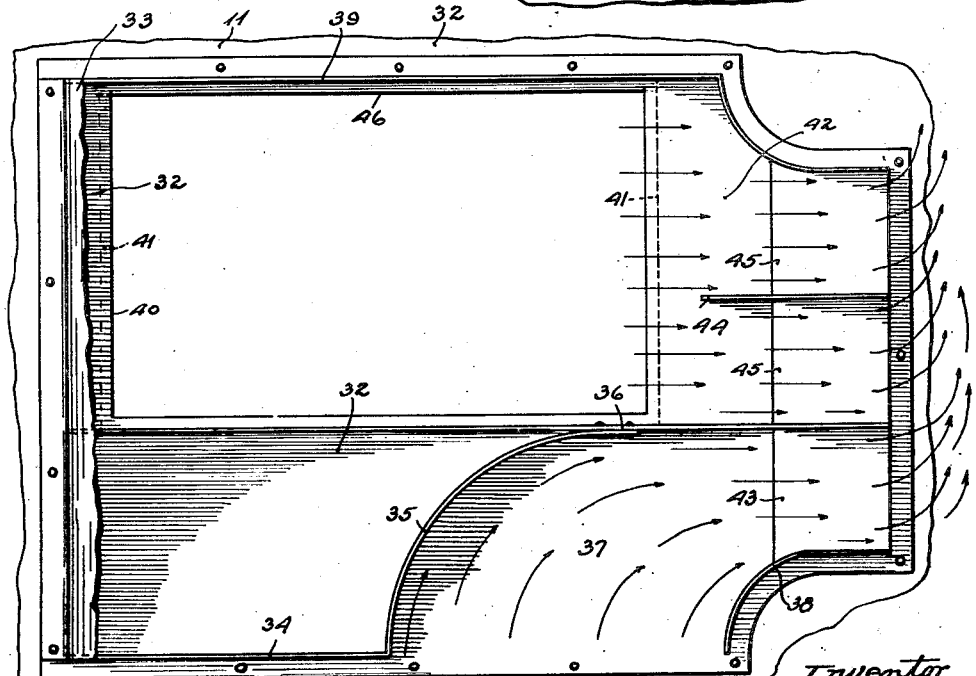

UNITED STATES PATENT OFFICE.

THOMAS H. GARLAND, OF CHICAGO, ILLINOIS.

VENTILATING APPARATUS.

1,163,138.   Specification of Letters Patent.   Patented Dec. 7, 1915.

Application filed December 18, 1914. Serial No. 877,855.

*To all whom it may concern:*

Be it known that I, THOMAS H. GARLAND, a citizen of the United States, and a resident of Chicago, in the county of Cook and State of Illinois, have invented certain new and useful Improvements in Ventilating Apparatus, of which the following is a specification.

My invention relates to ventilating apparatus which is particularly adaptable for traveling vehicles for delivering air in one part thereof and exhausting the vitiated or heated air from another part thereof.

In automobiles, as constructed at the present day, the engine is confined in the space in front of the dash board and below the hood and the slanting foot-board. When the vehicle travels the heat is thrown back against the dash-board and foot-board and the front end of the car becomes uncomfortably hot, particularly for the feet. Also at the top of the hood considerable heat accumulates.

One of the important objects of my invention is therefore to provide improved ventilating apparatus which will not only efficiently exhaust heated air from the hood and from below the foot-board but which will also direct air into the front of the vehicle body above the foot-board and adjacent the dash-board.

One of the important features of my invention is the provision of a unitary ventilating device which can be applied to the side of a vehicle to operate, when the vehicle is running, to exhaust heated air from the space below the hood and to charge cool air into the vehicle body adjacent the dashboard and over the foot-board.

On the accompanying drawings I have shown my invention applied to an automobile and Figure 1 is a front view of an automobile showing ventilators in place on the hood; Fig. 2 is a side elevational view of the front end of an automobile showing a hood ventilator in place and also a ventilating unit which communicates with both the space under the hood and foot-board and the space within the vehicle body above the foot-board; Fig. 3 is an enlarged side elevational view of the section of the vehicle body adjacent the foot-board with the cover or top of the ventilating device in greater part removed; Fig. 4 is an end view of the parts shown in Fig. 3 with the vehicle wall shown in section on plane 4—4, Fig. 3; Fig. 5 is an enlarged perspective view of the ventilating device applied to the hood, and Fig. 6 is a plan view of the ventilating device of Fig. 5 with the greater part of the top wall or cover thereof removed.

The automobile shown has the body 10, the hood 11, the dash-board 12, the floor 13, and the inclined foot-board 14 extending between the dash-board and the floor. At the front of the vehicle is the radiator 15. When the engine is running a great deal of heat is generated in the space under the hood, in front of the dash-board and foot-board. The fan in operation at the front end and the air rushing through the passageways of the radiator will drive this heat against the dash-board and foot-board, the driver's section of the vehicle becoming uncomfortably hot, particularly for the feet which rest against the foot-board.

Figs. 3 and 4 show the device which is particularly adaptable for application to the sides of the vehicle to draw heat from the space below the foot-board and to charge cool air into the space above the foot-board. The ventilating device V shown comprises a base 16 and the outer wall 17, the upper section 17' of this outer wall deflecting gradually toward the base to form the top of the structure. A wall 18 extending horizontally between the base and outer wall divides the structure into an exhaust section $e$ and an intake section $i$. The rear (with reference to the vehicle) end of the ventilating structure is closed by a vertical wall 19 extending between the base and outer wall. An intermediate wall 20 extends vertically between the base and outer wall and downwardly from the wall 18. Inside the walls 18 and 20 the base 16 has the exhaust outlet opening 21, and above the wall 18 the intake opening 22 is provided in the base. Extending from the forward end of the wall 18 to the wall 20 is the curved plate 23, this plate and the lower end of the wall 20 forming the rear wall of a cowl passageway 24. The ventilating device is secured against the side structure S of the vehicle adjacent the foot-board, this side structure being provided with a passageway 25 above the foot-board and with a passageway 26 below the foot-board, the ventilating structure being so applied that its openings 21 and 22 will communicate respectively with the passageways 26 and 25. The lower end of the ventilating structure is open and therefore when the vehicle travels forwardly the air will encounter the curved plate 23 and its horizontal direction of travel will be changed to a downward direction through cowl passageway 24. When this deflected air emerges from the open lower end of the cowl passageway it is again deflected horizontally and caused to flow across the outlet O between the walls 19 and 20, which outlet communicates with the exhaust opening 21. Such flow of air across the outlet will create suction and eductive effect and heated air will be drawn from the space below the foot-board through exhaust opening 21 and downwardly through the outlet from the ventilating structure. Above the wall 18 air will rush into the open forward end of the structure and will flow through opening 22 into the space in the vehicle body above the foot-board. This simultaneous withdrawal of heated air from below the foot-board and charging of cool air into the body above the foot-board will maintain the driver's section of the vehicle at a comfortable temperature.

In order to produce more efficient travel of air through the cowl passageway 24 this passageway may be provided with an outer wall 27 which is substantially parallel with the inner cowl wall 20, 23. One or more intermediate curved deflector walls 28 may also be provided in the cowl entrance to effect more uniform distribution of air. For the same reason one or more deflector walls 29 may be provided in the entrance of the intake section 22 of the structure. In order to effect more uniform flow of air from the exhaust outlet 21 through the exhaust outlet O such outlet is sub-divided transversely by one or more walls 30, and longitudinally by one or more horizontal partitions 31. The arrows in Fig. 3 indicate the direction of the air through the ventilating device.

In Figs. 5 and 6 is shown in detail the construction of the exhaust ventilating devices E which are placed on the hood of the automobile in the manner illustrated in Figs. 1 and 2. Each of these devices comprises a base 32 and a top wall 33. The base is shaped to follow the curvature of the hood 11 and the top is above the base at the outer end thereof and deflects gradually toward the base and meets it at the upper edge thereof. The forward side of the ventilating structure is closed at its inner end by the wall section 34 extending between the base and top walls, and deflecting inwardly and downwardly from the outer end of this wall 34 is the curved wall section 35 which meets the wall section 36, these wall sections forming the rear wall of a cowl passageway 37 of which the outer wall 38 extends substantially parallel with the rear walls 35 and 36. The rear end of the ventilating device is closed by the wall 39 between which and the walls 34, 35 and 36 the base 32 is provided with an outlet opening 40 adapted to register with a suitable opening 41 provided in the hood. The outer end of the exhaust passageway 42 terminates in a common plane with the cowl passageway 37. When the vehicle is driven forwardly air enters the cowl passageway in which it is deflected from horizontal direction to transverse direction, but upon emerging from the cowl passageway it is deflected to flow across the outlet of passageway 42, and suction effect is exerted which results in the heated air being drawn from inside the hood through the openings 41 and 40 and through passageway 42. In order to cause a uniform exhaust from the hood at both the upper and lower part of the ventilator, the outlet of the cowl passageway may be vertically sub-divided by partitions 43, and for the same reason the passageway 42 may be horizontally sub-divided by one or more partitions 44 and vertically sub-divided by one or more partitions 45.

As the vehicle travels the heated air under the hood is driven rearwardly toward the dash-board. In order to deflect the heated air into the ventilating devices a deflector plate 46 is provided adjacent the opening 41. As shown in Fig. 5 this deflector plate may be stamped from the base of the ventilating device and deflected downwardly through the opening 40 at any desired angle. Then when the automobile travels a great part of the heated air under the top of the hood will strike the deflector plate and be deflected into the ventilating devices and through the exhaust outlets thereof.

Instead of having the ventilating devices E in the form of separate structures which are secured to the hood, they could be built right into the hood as shown in Figs. 1 and 2, the top wall 33 being stamped from the hood and offset therefrom and the various cowl and eduction passageway walls inserted between the hood and the top wall 33 deflected therefrom.

I have found that ventilating devices V which in a unitary structure provide for both intake and eduction, are very efficient, not only in taking care of and assisting in withdrawing the air from underneath the hood, but are also efficient in maintaining a comfortable temperature in the front of the vehicle particularly at the dash-board and foot-board. In order to control the flow of cooling air into the vehicle a suitable regulator or damper 47 may be provided for the opening 22. A suitable regulator may also be provided for opening and closing the exhaust outlets. Each ventilator structure V could be a separate device secured to the vehicle wall over the intake and exhaust openings thereof, or such ventilating devices could be built in as part of the vehicle wall in substantially the same manner as the ventilators E on the hood.

The ventilators such as V can also be used efficiently in railways cars for charging fresh air to the car and for exhausting vitiated or hot air therefrom. Where such ventilators are used on automobiles together with the eduction ventilators mounted on the hood, the hot air can be readily taken care of and accumulation of heat prevented. I do not of course desire to be limited to the exact construction and arrangement shown as changes and modifications may no doubt be made which would still come within the scope of my invention.

I claim as follows:

1. In combination with a vehicle, a unitary ventilator attachment having an air intake section and an exhaust section, means connecting said intake section with one part of the vehicle and means connecting said exhaust section with another part of the vehicle.

2. In combination with a vehicle having a wall between the vehicle body and the engine containing space, of a unitary ventilating attachment having an intake section connected with the interior of the body at one side of said wall and having an exhaust section connected with the engine space at the opposite side of said wall whereby cool air is charged into the body and heated air simultaneously withdrawn from the engine space.

3. The combination with an automobile having an engine containing space and a dash-board and foot-board separating such space from the interior of the automobile body, the side of the automobile having an air inlet opening above the foot-board and an air outlet opening below the foot-board, of a ventilating device having an air outlet opening and an air inlet opening separated from each other and adapted upon application of the ventilating device to the side of the car to communicate respectively with the inlet and outlet openings in said side, an air intake passageway communicating with the air inlet opening and facing the direction of travel of the vehicle, an outlet passageway in the device from said outlet opening, and a cowl forming part of the device having its inlet facing the direction of travel of the vehicle and having its outlet positioned with reference to the mouth of said outlet passageway to direct air thereacross to create eductive effect for drawing out the air from the space below the foot-board.

4. The combination with an automobile, of a unitary ventilator structure having an air inlet and an air outlet adapted when the structure is secured to the automobile to communicate respectively with the space above the foot-board and the space below the foot-board, walls for said structure forming an intake passageway for guiding air through said inlet opening communicating with the space above the foot-board, and other walls forming cowl passageways for receiving air as the vehicle travels and conducting and guiding the flow of said air across said outlet communicating with the space below the foot-board in order to create eduction effect acting to withdraw air from said space.

In witness whereof, I hereunto set my hand this 16th day of December, A. D., 1914.

THOMAS H. GARLAND.

Witnesses:
C. J. SCHMIDT,
EDMUND G. INGERSOLL.